J. M. LEA.
TRANSMISSION LOCK.
APPLICATION FILED SEPT. 30, 1920.
1,396,855. Patented Nov. 15, 1921.
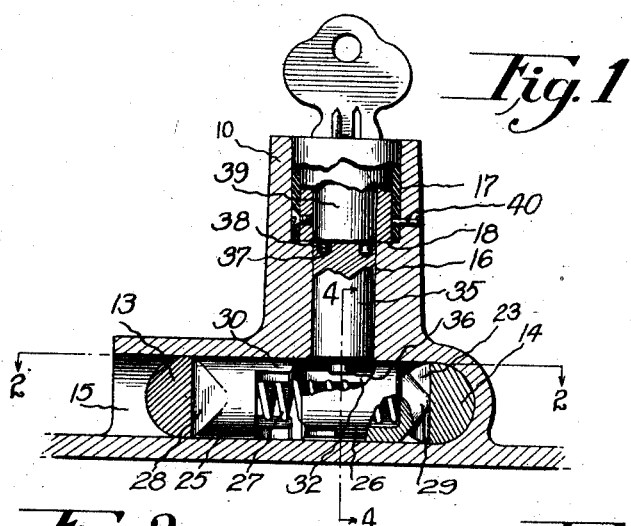
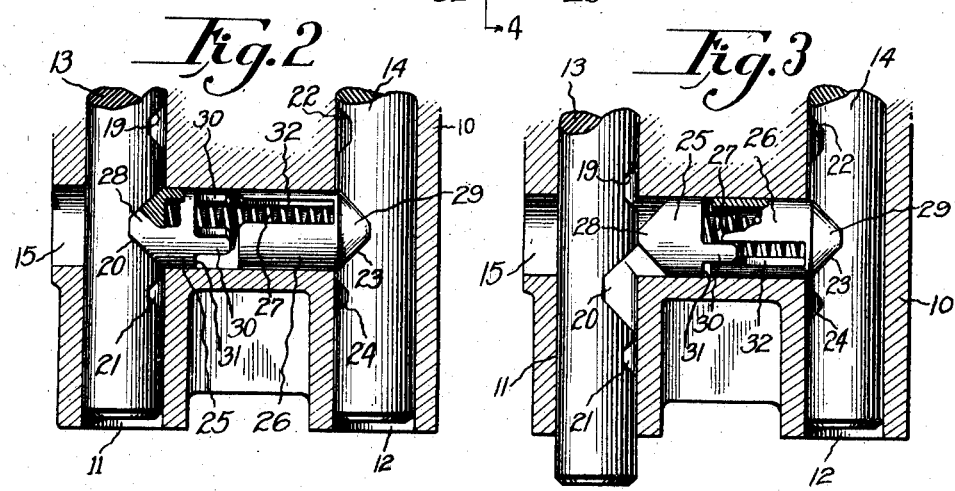
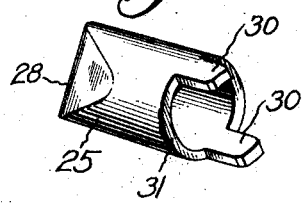
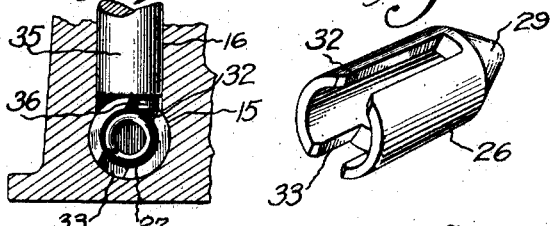
Witness
Inventor
John M. Lea
By his Attorneys

UNITED STATES PATENT OFFICE.

JOHN M. LEA, OF DETROIT, MICHIGAN, ASSIGNOR TO GENERAL MOTORS CORPORATION, OF DETROIT, MICHIGAN, A CORPORATION OF DELAWARE.

TRANSMISSION-LOCK.

1,396,855.      Specification of Letters Patent.      Patented Nov. 15, 1921.

Application filed September 30, 1920. Serial No. 413,838.

*To all whom it may concern:*

Be it known that I, JOHN M. LEA, a citizen of the United States, and a resident of Detroit, county of Wayne, and State of Michigan, have invented certain new and useful Improvements in Transmission-Locks, of which the following is a full, clear, concise, and exact description, such as will enable others skilled in the art to which the invention relates to make and use the same, reference being made therein to the accompanying drawings, which form a part of this specification.

My invention relates to locking devices and is especially designed for use in connection with the transmission mechanism of automobiles, although it will be understood that the structure may be applied wherever it is desired to prevent unauthorized movement of one or more mechanical elements.

The invention has for one of its objects the provision in combination with a pair of longitudinally slidable shifter rods of a structure adapted to combine the functions of yieldable detents to retain the rods in adjusted positions, interlocking means to insure that not more than one rod at a time may be shifted from neutral position, and positive locking means adapted to be positioned to retain both rods in neutral position.

A further object is to provide a detent mechanism to be mounted between a pair of slidable rods and adapted to be acted upon by key-controlled means to positively lock the rods against movement.

A further object is to provide a detent mechanism for one or more elements moving in a rectilinear or other path and adapted, by a rotary movement of a part thereof, to positively prevent the movement of the said element or elements.

A further object is to improve and simplify the construction and operation of detents and locking devices in general, and with particular reference to devices employed for locking the transmission mechanism of automobiles.

Further objects and advantages will appear from the following description taken in connection with the accompanying drawings, in which—

Figure 1 is a vertical sectional view of one embodiment of my invention.

Fig. 2 is a horizontal section on line 2—2 of Fig. 1,

Fig. 3 is a similar view showing the parts in a slightly different position.

Fig. 4 is a fragmentary vertical section on line 4—4 of Fig. 1 and

Figs. 5 and 6 are perspective views of detent parts employed in the embodiment of the invention as illustrated.

In the drawings 10 indicates a frame or casing structure which may be of any character suitable to support and preferably to inclose the moving parts and which as shown may be the cover for the gear casing of an automobile. The casing or cover is provided with longitudinal bores 11, 12, to receive shifter rods 13, 14, and with a transverse bore 15 intersecting the bores 11 and 12. A cylindrical bore 16 formed in a vertically extending portion of the casing, and intersecting the bore 15, is enlarged at its upper or outer end at 17, forming a shoulder as at 18.

The rod 13 is provided with a plurality of stops adapted to coöperate with detent devices, the stops in this case being shown as notches 19, 20 and 21, the rod 14 being provided with similar stops or notches 22, 23, 24. The intermediate notches, 20, 23, which lie opposite the bore 15 when the rods are in neutral position, or when the mechanism to be shifted thereby is in inactive position, are deeper than the notches corresponding to power-transmitting or active positions for a reason to be hereafter explained.

In the bore 15 is mounted the detent mechanism designed to coöperate with the stops on the sliding rods and comprising two parts 25, 26. These detent parts are drilled or otherwise hollowed out as shown to provide alined seats for a coil spring 27 whereby the detent members are yieldingly forced outwardly from each other and into engagement with the rods 13, 14. The outer end of member 25 is formed with a wedge-shaped portion 28 adapted to seat in the correspondingly shaped notches 19, 20 and 21, whereby the rotation of member 25 is prevented. The outer end of member 26 however is formed with a conical portion 29 adapted to seat in the notches 22, 23, and 24, thus enabling the member 26 to be rotated within the bore 15 notwithstanding the engagement of the member with the rod 14.

The inner end of member 25 is cut away at intervals to provide one or more lugs 30 extending from the end face 31, two such lugs being shown in the drawings. The inner end of member 26 is slotted as indicated at 32, 33, the number, arrangement, and width of the slots being such that when they are brought into register with the lug or lugs 30 the lugs may enter the slots and slide freely therein thus reducing the over-all length of the two detent members. The corners of the lugs 30 and of the member 26 adjacent the slots 32, 33, are chamfered as shown to facilitate the entry of the lugs into the slots. The extent of sliding movement is limited by the engagement of the inner end of member 26 with the end face 31 of member 25. By reference to Fig. 3 it will be seen that the extent of collapsing or telescoping movement is sufficient to permit rod 13 to be shifted from intermediate or neutral position only when detent member 26 is seated in the deeper notch 23. Similarly, rod 14 can be shifted from neutral only when detent member 25 is seated in notch 20. The detent members therefore operate as interlocking means for preventing the shifting of either rod away from neutral position when the other rod is in any other than neutral position.

The length of lugs 30 is furthermore so selected that when both rods are in neutral position, as shown in Fig. 2, a slight space intervenes between the inner ends of the lugs and the inner end of member 26, thus permitting the rotation of member 26 relatively to member 25 into such position that the lugs are no longer in register with the slots 32, 33. In this position of the members the relative sliding or telescoping movement is limited by the engagement of the lugs against the end of member 26 thereby entirely preventing the shifting of either rod from neutral position.

Any convenient form of lock or key-controlled mechanism may be provided to bring about the slight oscillatory movement of member 26 necessary to bring the lug or lugs 30 into or out of register with the slot or slots in member 26. As illustrated I mount in the bore 16 a rotatable spindle 35 having at its lower end an eccentric lug or pin 36 engageable in the slot 32, which, for this purpose, is made longer than would be necessary for the reception merely of a lug 30. A rotary movement of spindle 35 through an angle of 180° will cause the oscillation of the member 26 through an angle sufficient to bring the slots 32, 33 from a position in register with the lugs 30 to a position entirely out of register with said lugs.

It will be seen that the engagement of the pin 36 in slot 32 serves to retain the member 26 positively in the locked or unlocked position, also that the engagement of the wedge-shaped end 28 with the correspondingly shaped notches in the rod 13 prevents the rotation of the member 25, hence there is no danger of the device failing to function properly by reason of improper alinement of the lugs and slots.

The spindle 35 may be suitably formed to be rotated by a lock, as by the provision of depressions 37 in the upper end adapted to receive pins or lugs 38 actuated by any usual or desired form of lock, as the cylinder lock 39. The lock may be seated upon the shoulder 18 and secured within the enlargement 17 of the bore 16 as by means of a pin 40.

It will be seen that the device will operate ordinarily as a detent mechanism to retain the shiftable member or members resiliently in the adjusted position. Furthermore, by proper selection of the dimensions of the stops on the shiftable members and of the interengaging parts on the detent members, an interlocking device is provided whereby the shifting of one of two members from neutral position is prevented when the other member is out of neutral position. Finally a positive lock is provided whereby the unauthorized shifting of one or more elements may be prevented.

It will be understood that the device will perform the functions of a detent and positive lock equally well if employed with but one shiftable member, one of the detent members operating merely against a fixed abutment, also that the movement of the shiftable member or members may be other than rectilinear. Various other changes in details of construction may be made without departing from the spirit and scope of the invention and I do not desire to be limited to the specific structure above described except as set forth in the following claims.

I claim:—

1. In a detent mechanism the combination with a shiftable element, detent devices therefor adapted to retain said element yieldingly in adjusted position, said detent devices having means adapted to be brought by rotative movement thereof into position to prevent the shifting of said element.

2. In a detent mechanism the combination with a shiftable element provided with stops, a detent adapted to coöperate with said stops to retain the element yieldingly in adjusted position, and means brought into operative position by rotation of said detent for preventing shifting movement of said element.

3. In a detent mechanism the combination with a shiftable element of detent devices therefor comprising a plurality of relatively rotatable parts and spring means acting between said parts for forcing one of said parts toward said element, said parts so constructed and arranged that they may be positioned by relative rotation to prevent shifting of said element.

4. In detent mechanism the combination of a plurality of shiftable elements, detent devices acting thereon, spring means for forcing said devices into engagement with said elements, and means for rotating a part of said detent devices, said devices being so formed that by such rotation they may operate to prevent movement of said shiftable elements.

5. In detent mechanism the combination of a pair of shiftable elements, detent devices acting thereon and comprising two relatively slidable and rotatable members, said members having interengaging parts adapted to be positioned by relative rotation to prevent relative sliding movement, and means for causing said rotation.

6. In detent mechanism the combination of a pair of reciprocable shifting rods, said rods provided with stops, detent devices comprising two members adapted to engage said stops, spring means adapted to force said members against said rods, said members provided with interengaging parts adapted to be positioned by rotation of one member to prevent movement of said members away from said stops, and lock controlled means for rotating said one member.

7. In detent mechanism the combination with two shiftable elements, slidable detents yieldingly pressed into engagement with said elements, one of said detents being rotatable and the other held against rotation, one of said detents being provided with slots and the other with lugs adapted to engage slidably in said slots, and means for rotating said rotatable detent to bring said lugs out of registry with said slots.

8. In detent mechanism the combination of two detent members, one slidable and the other rotatable, means being provided in one position of the rotatable member to limit the sliding movement, and in another position to prevent such sliding movement by interengagement of the two members.

9. In detent mechanism the combination with a reciprocable element of a detent movable toward and from said element, said detent comprising two relatively rotatable parts so formed and arranged that by relative rotation said parts may be positioned to prevent movement away from said reciprocable element.

In testimony whereof I affix my signature.

JOHN M. LEA.